(12) United States Patent
Mateo García et al.

(10) Patent No.: US 12,508,984 B2
(45) Date of Patent: Dec. 30, 2025

(54) DEVICE FOR IMPROVING NIGHT VISION OF VEHICLE DRIVERS AND METHOD FOR CONTROLLING THEREOF

(71) Applicant: GRUPO ANTOLÍN-INGENIERÍA, S. A., Burgos (ES)

(72) Inventors: Íñigo Mateo García, Burgos (ES); Sara Pérez Fontaneda, Burgos (ES); Miguel José Maldonado López, Burgos (ES); Alberto Mansilla Gallo, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 0 days.

(21) Appl. No.: 18/927,162

(22) Filed: Oct. 25, 2024

(65) Prior Publication Data

US 2025/0135990 A1    May 1, 2025

(30) Foreign Application Priority Data

Oct. 31, 2023    (EP) .................................... 23383109

(51) Int. Cl.
*B60Q 3/72*    (2017.01)
*B60Q 3/252*    (2017.01)
*B60Q 3/82*    (2017.01)
*B60Q 3/85*    (2017.01)
*H05B 45/20*    (2020.01)
*H05B 47/105*    (2020.01)

(52) U.S. Cl.
CPC ............... *B60Q 3/72* (2017.02); *B60Q 3/252* (2017.02); *B60Q 3/82* (2017.02); *B60Q 3/85* (2017.02); *H05B 45/20* (2020.01); *H05B 47/105* (2020.01)

(58) Field of Classification Search
CPC ............... B60Q 3/72; B60Q 3/82; B60Q 3/85
See application file for complete search history.

(56) References Cited

U.S. PATENT DOCUMENTS 6,056,424 A * 5/2000 DiNunzio ................ B60Q 3/85
362/490

* cited by examiner

*Primary Examiner* — Robert J May
(74) *Attorney, Agent, or Firm* — Banner & Witcoff, Ltd.

(57) ABSTRACT

Device for improving night vision of vehicle drivers comprising a controlled reduction of the driver's pupil diameter and the maintenance of said reduction over time in order to improve the visual capability of the vehicle driver, all of this, moreover, adapted to the pupil dynamics of the vehicle driver. It comprises a vehicle interior part comprising a carrier, a lighting device configured to emit pulsed light according to a sinusoidal wave emission varying in regular periods between 10 s and 30 s and a control means; a switching means and a user profile adjusting means.

7 Claims, 6 Drawing Sheets

DEVICE FOR IMPROVING NIGHT VISION OF VEHICLE DRIVERS AND METHOD FOR CONTROLLING THEREOF

CROSS-REFERENCE TO RELATED APPLICATIONS

This application claiming priority to EP23383109.8, filed Oct. 31, 2023, the contents of which are incorporated herein by reference in its entirety.

TECHNICAL FIELD OF THE INVENTION

The present invention relates to a device for improving night vision of vehicle drivers comprising a controlled reduction of the driver's pupil diameter and the maintenance of said reduction over the time. Additionally, the invention relates to a method for controlling this device for improving night vision of vehicle drivers.

BACKGROUND OF THE INVENTION

Driving under low light conditions, and particularly at night, is difficult and involves a risk since that the visual capability of the vehicle driver necessary to control the vehicle outside situation is reduced.

Eye's pupils allow ambient light to enter inside the eyes in order to focus the image on the retina. Pupils are controlled by the iris, which, depending on the ambient light, that is on the luminous flux in the environment, can contract the pupil (miosis) or it can dilate it (mydriasis). Both effects are produced as a natural eye's response in light and dark environments.

Particularly under low light conditions, the pupil dilates increasing its diameter in order to capture as much light as possible making easier to sec. That is, the pupil adapts to the current ambient light situation.

However, this increase in the diameter of the pupil entails disadvantages related to common situations that arise under low light conditions, particularly during night driving.

One disadvantage arises when a sudden increase in the ambient light occurs, for example when approaching headlights of oncoming vehicles.

In this situation the vehicle driver is dazzled due to an abrupt luminous flux entering through the pupils being dilated. When this change in the ambient brightness is produced suddenly, the pupils have no time to react for contracting the pupil and consequently the dazzling cannot be avoided. Therefore, the vehicle driver is temporally unable to see, with the resulting risk during a driving situation.

Other disadvantage arises due to the light entering through the peripheral area of a pupil being dilated, that is when it has the maximum diameter. The periphery of the ocular dioptric components (cornea and lens) exhibit optical imperfections due to a refractive error produced by the shape of the eye or the cornea.

When the light passes through said peripheral area, the effects of existing optical aberrations increase. Therefore, it causes blurred vision when looking at distant objects and eyestrain among other affecting negatively the visual capability of the vehicle driver. This phenomenon is called night myopia.

All of the above effects affecting the visual capability of the vehicle driver can be further aggravated due to the vehicle driver's age, due to the fact that he/she suffers from a visual pathology such as cataract or due to the fact that he/she has undergone an ocular surgery that may affect the ocular surface of the eye such as LASIK surgery or intraocular surgery.

Particularly, after cataract surgery when light passes through ocular structures, it undergoes uneven refraction and dispersion phenomena, which, in low-light environments when the pupil is dilated, lead to dysphotopsias in the form of glare, halos, flashes, and/or combinations of these around light sources.

Therefore, said dysphotopsias compromise the perceived vision quality and comfort for the vehicle driver.

Several patent documents address the problem posed disclosing the use of lighting devices particularly provided inside the vehicle in order to assist the vehicle driver during the night driving or during driving under low light conditions.

Some of said lighting devices considered according to the present invention as a first group are designed to continuously work during the night driving for reducing the diameter of the vehicle driver's pupils in anticipation of the ambient light changes produced under said low light conditions. Some examples can be DE4218436A1, U.S. Pat. No. 4,905,125A or US20110235361 A1.

Other lighting devices considered according to the present invention as a second group are designed to work only under particular abrupt changing light conditions such as when oncoming vehicle high beam headlights are detected or when the vehicle enters or exits a tunnel.

Said lighting devices act in order to adapt the diameter of the vehicle driver's pupils upon detecting said imminent ambient light changes by using appropriate devices to anticipate said imminent situations. Therefore in said cases, the lighting devices work occasionally. Some examples can be WO2022/122853 A1,WO2021/093532 A1 and DE102008043601 A1.

The present invention is framed in the first group above described, that is the lighting device is designed to continuously work during the night driving.

Although the solutions disclosed in the first group achieve the pupil's diameter reduction avoiding the disadvantages above disclosed, it has been proved that pupils tend to dilate over time despite the lighting device is still working. Therefore, the positive effects on the visual capability of the vehicle driver are not maintained over the time, instead they disappear as pupil become dilated.

Said phenomenon is attributed to the visual adaptation process responsible for maintaining an optimal vision under varying lighting conditions.

Visual adaptation is the adjustment of the eye to different luminance.

When changing from light to dark and vice versa, visual adaptation is initially performed by an abrupt increase or reduction of the pupil's diameter.

In this first step of the visual adaptation process, the pupil's diameter reaches its minimum when luminance changes from dark to light and its maximum when luminance changes from light to dark.

However, as the eye is adapted to the new luminance situation the pupil's diameter enlarges or reduces according to the new luminance, until said pupil's diameter is stabilized.

Therefore, according to the visual adaptation process, the minimum pupil's diameter which provides the positive effects described above during the night driving, lasts only a few seconds. Thus, said positive effects are not maintained over the time.

Additionally, there is a high interpersonal variability in pupil dynamics due to different factors such as age, genetic factors, visual pathologies, ocular surgery operations, etc. affecting to the pupil response when ambient light conditions change.

Therefore, the dilation and the contraction of the pupils in light and dark environments as a natural response it is not produced in the same way for all the vehicle drivers. Instead, the way in which the pupils respond to light changes is different depending on said factors mentioned above.

This means that there is no a proportional relationship between the light intensity needed to contract the pupil of a particular vehicle driver and the percentage of reduction obtained.

Therefore, each particular vehicle driver needs a particular light intensity in order to reach the target pupil reduction.

In view of the disadvantages mentioned above, the object of the invention is a device for improving night vision of vehicle drivers comprising a controlled reduction of the driver's pupil diameter and the maintenance of said reduction over time in order to improve the visual capability of the vehicle driver, all of this, moreover, adapted to the pupil dynamics of the vehicle driver.

DESCRIPTION OF THE INVENTION

The present invention is defined and characterised by the independent claims, while the dependent claims describe additional features thereof.

Vehicle according to the invention may include, but no limited to cars, auto caravans, vans, lorries, buses, and the like.

Due to the fact that the device is provided inside the vehicle having the particular light properties claimed, it is possible to carry out a controlled reduction of the pupil's diameter.

Firstly, this prevents a sudden change of ambient light dazzles the vehicle driver.

Additionally, this prevents the night myopia phenomena due to the light entering through the peripheral area of the pupil when it is dilated.

Due to the fact that the light directly emitted by the lighting means is diffused it does not fall on the vehicle driver's eyes, in this way visual discomfort of the vehicle driver is avoided.

Additionally, the diffused light strikes the illuminated objects from multiple angles achieving a uniform and homogeneous illumination, i.e. light that propagates in all directions. It allows reducing the pupil's diameter more efficiently.

Due to the fact that the light emitted is not continuous, instead it is pulsed light emitted according to a sinusoidal wave emission having the particular properties claimed, it is possible to keep the pupil's diameter according to its maximum reduction over the time and consequently to keep the positive effects of this maximum reduction during the night driving continuously. Particularly, the period claimed being in the range between 10 and 30 s ensures that the pupil does not have enough time to dilate as consequence of the adaptation process.

Due to the fact that the light emitted can be particularly controlled according to the user profile selected by the user profile adjusting means which takes into account the factors affecting the pupil dynamics of each vehicle driver, it is possible to achieve the pupil's diameter reduction in all the cases, that is, to achieve that the device takes effect for every vehicle driver irrespective of particular factors such as age and/or ocular pathologies.

Therefore, as the present invention takes into account said factors by defining different user profiles, it is possible to adjust the light emission in each particular case to ensure that on the one hand the pupil's diameter reduction is achieved and on the other hand it is made efficiently.

DESCRIPTION OF THE DRAWINGS

The present specification is complemented by a set of figures that illustrate a preferred embodiment, in no way limiting the invention.

DETAILED DESCRIPTION OF THE INVENTION

Figure 1:
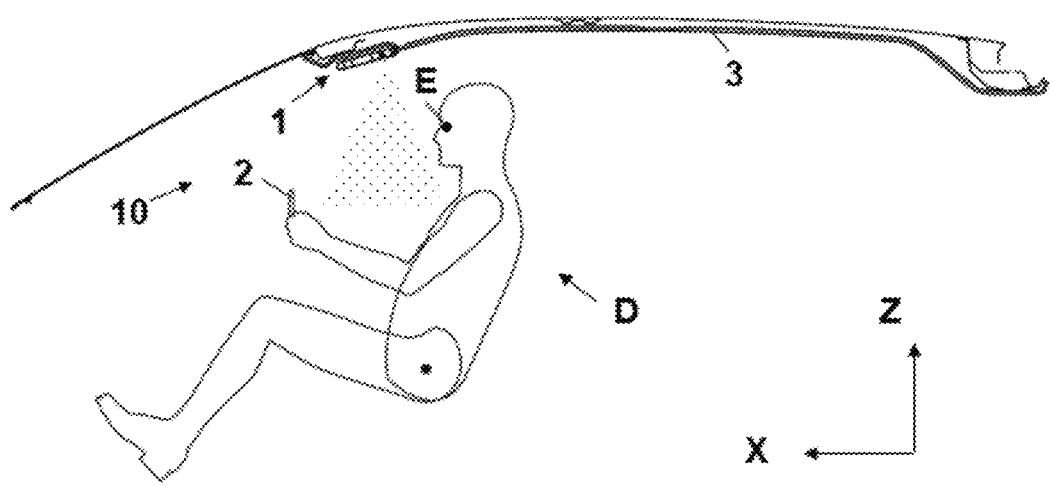
FIG. 1 shows a schematic cross-sectional view of a vehicle interior comprising a device for improving night vision of vehicle drivers according to the invention.

FIG. 1 shows a particular configuration of the device (10) for improving night vision of vehicle drivers according to the invention. It comprises a vehicle interior part (1), a switching means (1.4) and a user profile adjusting means (2) where the vehicle interior part (1) is particularly a sunvisor.

This configuration is particularly advantageous due to the relative position of the sunvisor with respect to the driver's eyes as it allows the device for improving night vision to provide a lighting fulfilling three functions, namely, reducing the pupil's diameter, being outside the vision field preventing glare and at the same time being sufficiently close to the eyes to control the energy consumption.

Other configurations not represented are also considered by the invention where the vehicle interior part (1) is for example the pillar A, the headliner or the overhead console.

Returning to the particular configuration represented in the figures, the working position of the device (10) corresponds to the stowed position of the sunvisor (1) in which it rests against the headliner main surface.

Taking into account that the device (10) of the invention only works under low light conditions when the sunvisor (1) is in the stowed position, both devices, namely the sunvisor as antiglare device and the device (10) for improving night vision, can fulfil their particular function without detriment to each other.

Therefore, the device (10) for improving night vision of vehicle drivers of the invention is configured to work in a fixed position corresponding, in this particular case, to the stowed position of the sunvisor (1).

Figure 4:
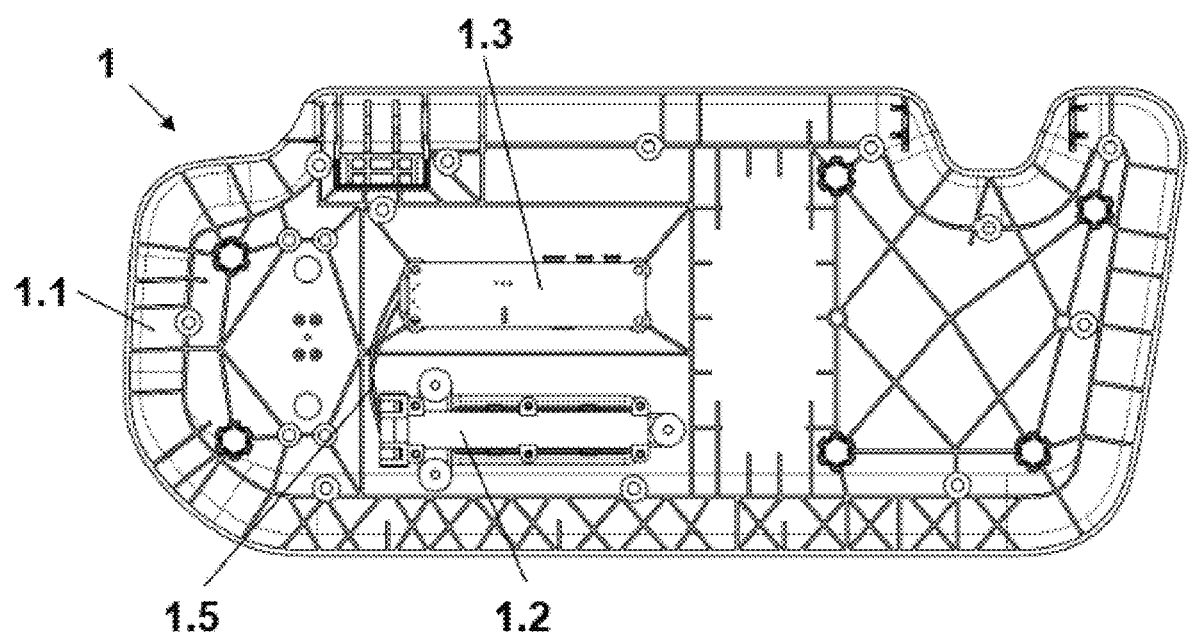
FIG. 4 shows a front view of an inner side of one of the sunvisor's half-shells acting as support for part of the device.

FIG. 4 shows an inner side of the sunvisor (1) in order to appreciate in detail some of the main parts forming the device (10), in particular it comprises a carrier (1.1), a lighting device (1.2), a control means (1.3) and a switching means (1.4).

The carrier (1.1) acts as support for some of the components forming the device (10). In this particular case the carrier (1.1) comprises one of the half-shells made of plastic material forming the main body of the sunvisor (1). In general, the carrier (1.1) comprises at least a portion of the interior vehicle part (10).

The lighting device (1.2) comprises at least a lighting means (1.2.1) and a light diffusing means (1.2.2) and it is arranged on the carrier (1.1).

The lighting means (1.2.1) are configured to emit light having a wavelength being in the range between 420 and 750 nm, that is the visible spectrum for the human eye.

According to a particular configuration, the lighting means (1.2.1) are configured to emit light having a wavelength being in the range between 420 and 500 nm. This particular configuration is advantageous as it allows optimizing the energy consumption of the lighting means (1.2.1). Additionally, this particular range allows stimulating the intrinsically photosensitive retinal ganglion cell (IpRGCs) in order to improve the awareness of the vehicle driver (D).

According to another particular configuration, the lighting means (1.2.1) are configured to emit light having a wavelength being in the range between 620 and 700 nm. This particular configuration is advantageous as it promotes relax and calm of the vehicle driver (D) and this effect can be advantageous in some situations. Additionally, this particular wavelength range provides beneficial effects to the cornea and to the visual general system.

Figure 5:
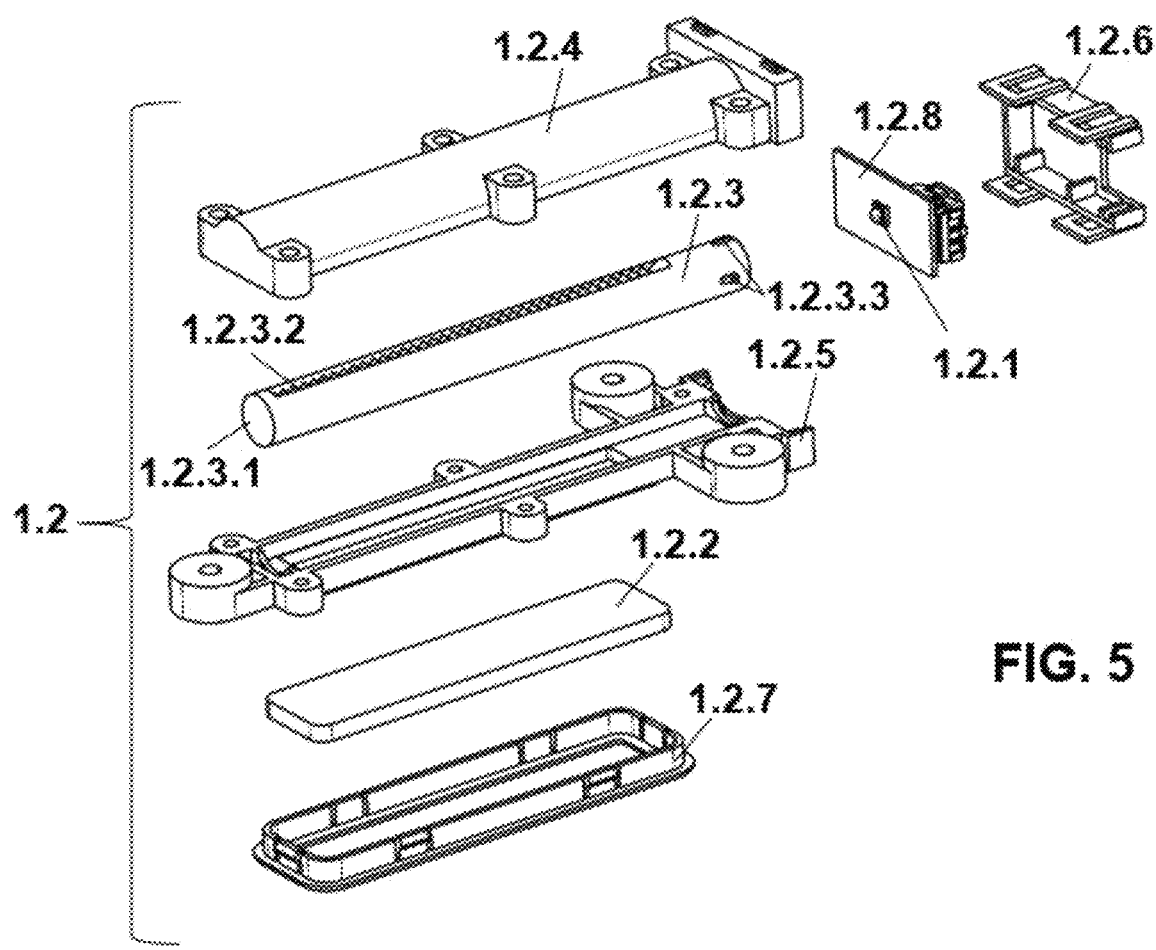
FIG. 5 shows an exploded view of the lighting device according to an embodiment of the invention.

According to the particular configuration represented in FIG. 5, the lighting means (1.2.1) comprise an only LED provided in a printed circuit board (1.2.8). According to the particular configuration represented in FIG. 6, the lighting means (1.2.1) comprise three LEDs provided on a common printed circuit board (1.2.8).

The invention is not limited to the type, number and particular arrangement of the lighting means (1.2.1) provided that they allow that the ocular plane (OP, OP', OP") of the vehicle driver (D, D', D") receives the irradiance defined in detail later on.

The light diffusing means (1.2.2) are configured to diffuse the light emitted by the lighting means (1.2.1) and to emit the diffused light inside the vehicle. The light diffusing means (1.2.2) allows obtaining uniform and soft illumination that scatters in multiple directions being distributed more evenly, encompassing a broader area and without creating distinct shadows in order not to glare the vehicle driver (D, D', D").

According to the configuration represented in FIG. 5, the light diffusing means (1.2.2) are arranged perpendicular to the printed circuit board (1.2.8) comprising the lighting means (1.2.1).

Optionally, the lighting device (1.2) can further comprise light guiding means (1.2.3) between the lighting means (1.2.1) and the light diffusing means (1.2.2) in order to distribute and homogenise the light directly emitted by the lighting means (1.2.1).

The use of the light guiding means (1.2.3) are particularly advantageous due to the fact that they allow providing a very compact arrangement as the light guiding means (1.2.3) facilitate the light distribution within a reduced area according to the thickness of the vehicle interior part (1). Thus, this particular configuration facilitates the integration of the device (10) in the vehicle interior part (1) in general, and in particular, in the example represented in the figures where the vehicle interior part (1) is a sunvisor, in said sunvisor (1).

Additionally, the use of the light guiding means (1.2.3) allows optimize the expenditure of energy and components as an only LED is enough to achieve a uniform lighting.

According to the particular configuration represented in FIG. 5 the light directly emitted by the lighting means (1.2.1), namely the LED represented in this figure, is received and distributed by the light guiding means (1.2.3) comprising in this particular case, a light pipe body (1.2.1.1) which receives by one of its ends, the light directly emitted by the lighting means (1.2.1).

In order to extract the light from the light guiding means (1.2.3), it further comprises a light extracting means (1.2.3.2) arranged to extract and direct the light to the light diffusing means (1.2.2).

In addition, this light guiding means (1.2.3) can comprise attaching means (1.2.3.3) in order to ensure its relative position regarding the lighting means (1.2.1) and in this way use conveniently the light emitted by them (1.2.1).

In addition, the assembly forming the lighting device (1.2) represented in FIG. 5, further comprises several casings (1.2.4, 1.2.5, 1.2.6) for protecting the parts forming the assembly, ensuring their relative positions and allowing the attachment of the assembly to the carrier (1.1).

According to this particular case, the light guiding means (1.2.3) are arranged between a first casing (1.2.4) and a second casing (1.2.5) enclosing them. Additionally, the lighting means (1.2.1) provided in the printed circuit board (1.2.8) are attached to both first and second casings (1.2.4, 1.2.5) and covered by a third casing (1.2.6) which protects said last sub-assembly (1.2.1, 1.2.8) and which allows establishing the electrical connection with the control means (1.3) described in detail later.

Additionally, the assembly represented in FIG. 5 comprises a decorative frame (1.2.7) which can be seen together with the light diffusing means (1.2.2) from the vehicle inside.

Figure 6:
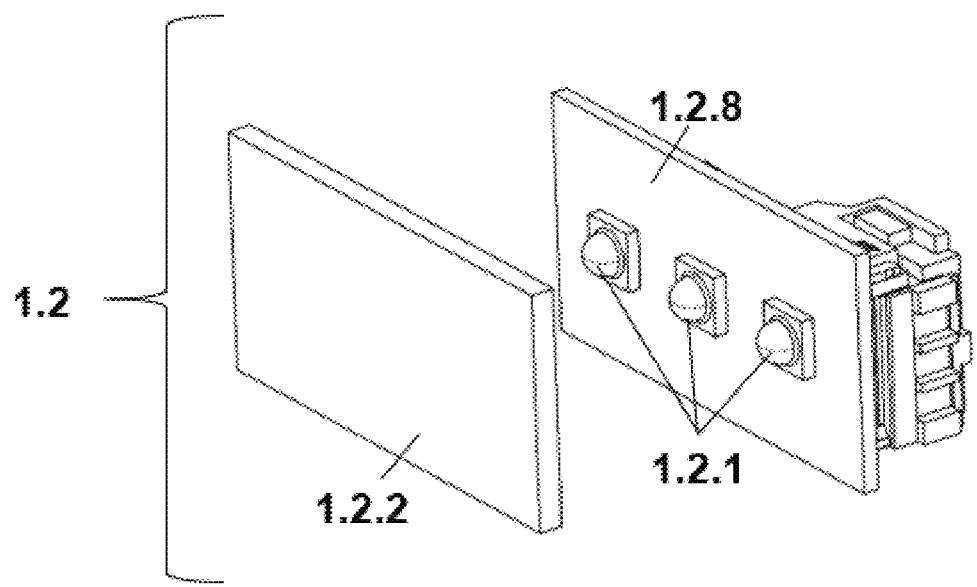
FIG. 6 shows an exploded view of the lighting device according to another embodiment of the invention.

According to the configuration represented in FIG. 6, the light diffusing means (1.2.2) are arranged parallel to the printed circuit board (1.2.8) comprising the lighting means (1.2.1), namely the three LEDs represented in the figure.

According to this particular configuration the light directly emitted by the lighting means (1.2.1) is received by the light diffusing means (1.2.2) in order to be emitted to inside the vehicle.

For the shake of simplicity, the casings have not been represented in this figure. However, the invention also considers the addition of them to this assembly conveniently in order to fulfil the same functions as the ones described in the assembly represented in the FIG. 5.

The particular design, components and the interaction between them forming the lighting device (1.2) will depend on the particular vehicle interior part where the device (10) is provided. Therefore, the invention considers other options not represented in the figures.

As mentioned above, the device (10) for improving night vision of vehicle drivers also comprises control means (1.3) and switching means (1.4).

The control means (1.3) are configured to control the light emitted by the lighting device (1.2) in order to fulfil the objective of the invention, a controlled reduction of the driver's pupil diameter and the maintenance of said reduction over time in order to improve the visual capability of the vehicle driver (D), all of this, moreover, adapted to the pupil dynamics of the vehicle driver (D). As FIG. 4 shows, the control means (1.3) are physically arranged in the carrier (1.1) and are connected to the lighting device (1.2) by wiring (1.5).

For the purpose of a controlled reduction of the driver's pupil diameter and the maintenance of said reduction over time, the control means (1.3) are configured to provide instructions to the lighting device (1.2) to emit pulsed light according to a sinusoidal wave emission varying in regular periods being in the range between 10 s and 30 s, wherein each period comprises a minimum radiant flux value being greater than 0.

More particularly, the lighting device (1.2) is configured to emit pulsed light in such a way that when said pulsed light falls on the ocular plane (OP, OP', OP''), the irradiance received by said ocular plane (OP, OP', OP'') follows a sinusoidal wave varying in regular periods being in the range between 10 and 30 s where the irradiance in the lowest point of each period is in the range between 2 and 25 nW/cm2, and the irradiance in the highest point of each period is in the range between 30 and 60 nW/cm2.

Figure 7:
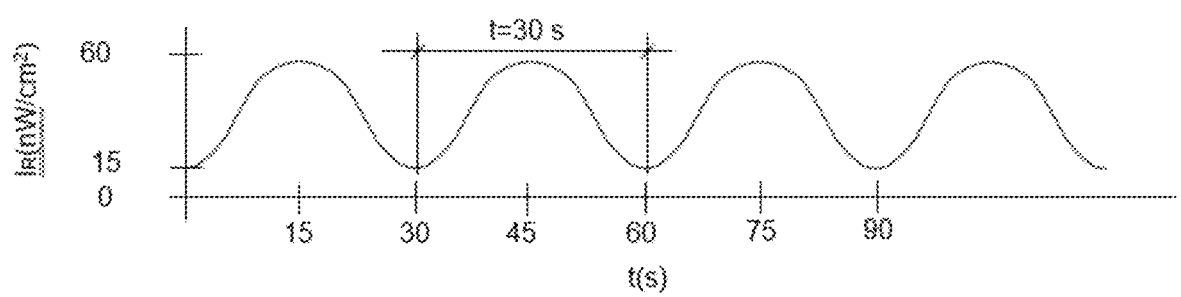
FIG. 7 shows a sinusoidal wave corresponding to the irradiance received by the ocular plane due to a first pulsed light.
Figure 8:
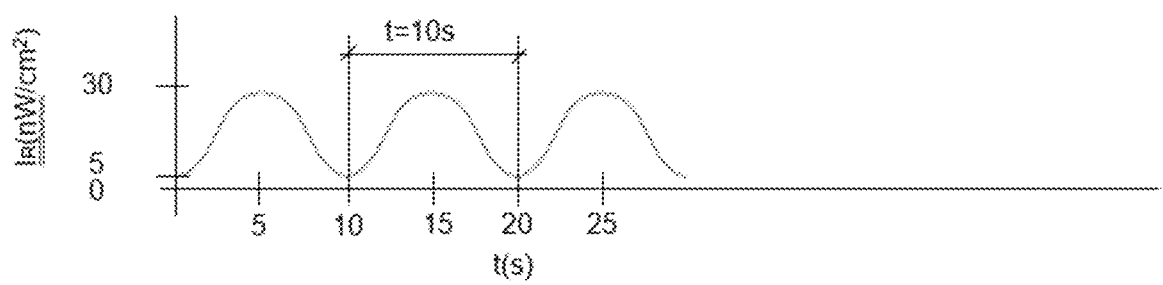
FIG. 8 shows a sinusoidal wave corresponding to the irradiance received by the ocular plane due to a second pulsed light.

In particular, as the examples represented in FIGS. 7 and 8 where the sinusoidal waves corresponding to the irradiance received by the ocular plane (OP, OP', OP'') are shown, when the lighting device (1.2) starts to emit light, it does so starting from the lowest value of radiant flux.

Figure 2:
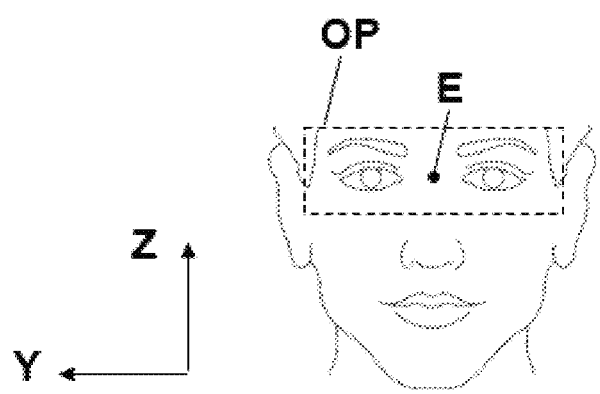
FIG. 2 shows a front view of the vehicle driver face in order to represent the ocular plane OP.

The ocular plane (OP, OP', OP''), as FIG. 2 shows, is a plane covering the vehicle driver's eyes area defined by the Z vehicle direction and the Y vehicle direction that contains the central point (E, E', E''), that is, a central point between right and left eyes where the driver eye locations are defined according to ISO 4513:2022.

Obviously, depending on the distance between the lighting device (1.2) and the vehicle driver (D, D', D''), said lighting device (1.2) will be configured to emit more or less radiant flux in order to the ocular plane (OP, OP', OP'') finally receives the particular irradiance defined above.

In turn, said distance mainly depends on the particular position of the device (10) inside the vehicle. As it was mentioned above, the device (10) could be arranged in the sunvisor, in the A-pillar or in the headliner for example.

Figure 10:
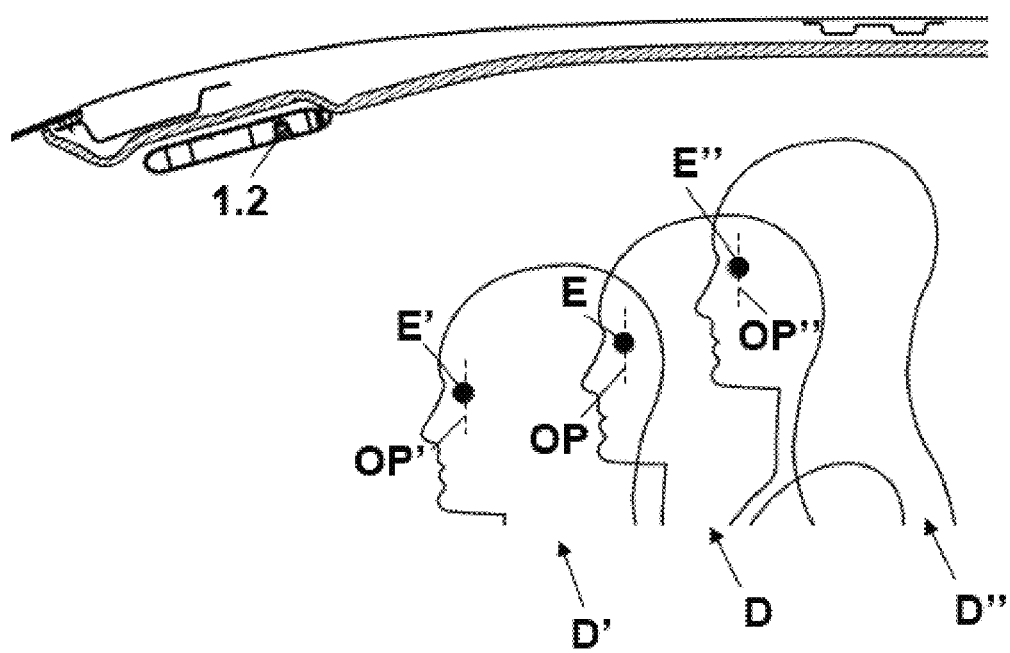
FIG. 10 shows a schematic cross-sectional view of a vehicle interior comprising a device for improving night vision of vehicle drivers according to the invention where three different vehicle driver's percentiles are represented.

On the other hand, depending on the vehicle driver's percentile, the ocular plane (OP, OP', OP'') defined by the central point (E, E', E'') can be at different positions from the lighting device (1.2) as FIG. 10 shows, that is, the ocular plane (OP, OP', OP'') can be further or closer to the lighting device (1.2).

However, the range of irradiance values provided above is defined to ensure a properly working of the device (10) by covering any ocular plane (OP, OP', OP'') position and consequently any vehicle driver (D, D', D'') percentile.

Figure 9:
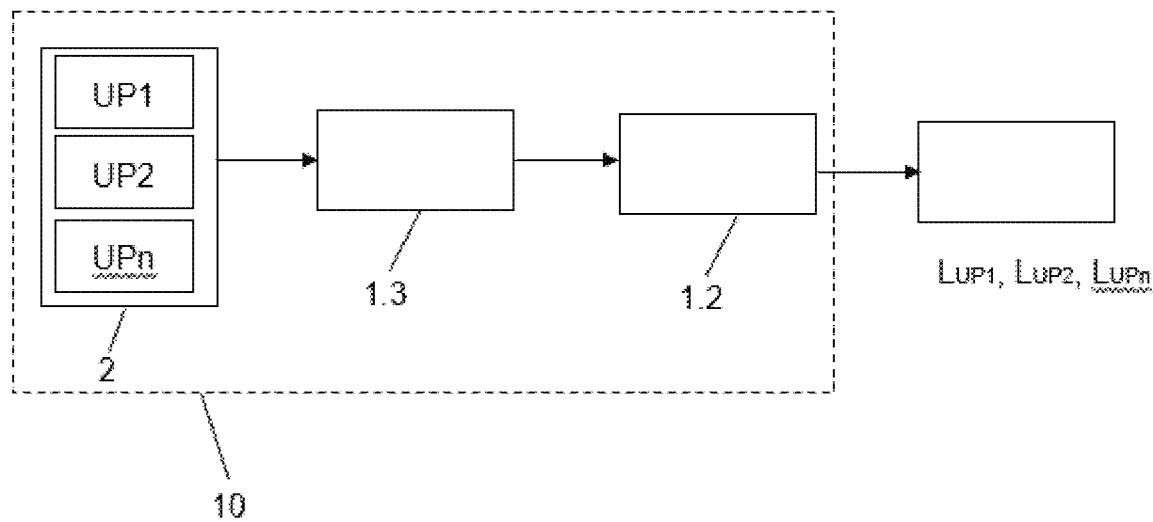
FIG. 9 shows a schematic representation of a control system for controlling the device (10) for improving night vision of vehicle drivers.

For the purpose of adapting the controlled reduction of the driver's pupil diameter to the pupil dynamics of the vehicle driver (D, D', D''), the device (10) further comprises user profile adjusting means (2) which are represented in FIG. 1 and in FIG. 9.

The user profile adjusting means (2) allows the vehicle driver (D, D', D'') selecting between at least a first user profile (UP1) and a second user profile (UP2), both user profiles (UP1, UP2) being different between them.

The invention considers the definition of more than the two mentioned user profiles (UP1, UP2, . . . , UPn).

The lighting device (1.2) emits first pulsed light ($L_{UP1}$) according to the first user profile (UP1) and a different second pulsed light ($L_{UP2}$) according to the second user profile (UP2). Therefore, the lighting device (1.2) emits pulsed light ($L_{UP1}$, $L_{UP2}$, . . . $L_{UPn}$) according to the corresponding user profile (UP1, UP2, UPn).

By way of example, FIG. 7 shows a sinusoidal wave corresponding to the irradiance received by the ocular plane due to the first pulsed light ($L_{UP1}$). It comprises a sinusoidal wave varying in regular periods of 30 s, the irradiance in the lowest point of each period is 15 nW/cm2, and the irradiance in the highest point of each period is 60 nW/cm2.

By way of example, FIG. 8 shows a sinusoidal wave corresponding to the irradiance received by the ocular plane due to the second pulsed light ($L_{UP2}$). It comprises a sinusoidal wave varying in regular periods of 10 s, the irradiance in the lowest point of each period is 5 nW/cm2, and the irradiance in the highest point of each period is 30 nW/cm2.

Said user profiles (UP1, UP2) can be defined according to several factors which differentiate one vehicle driver from another vehicle driver according to the visual capability of each of them. Said relevant factors can be age and/or ocular pathologies as for example LASIK surgery, cataract, intraocular lens, etc., and/or other factors.

According to a particular embodiment, the age classification to define the user profiles can be divided into three groups, namely vehicle drivers under 40 years old, vehicle drivers between 40 and 60 years old and vehicle drivers over 60 years old; and the classification according to the ocular pathologies can be divided into four groups, namely vehicle drivers with intraocular lens, vehicle drivers with cataract, vehicle drivers operated with laser such as LASIK (Laser assisted in Situ Keratomileusis) or vehicle drivers having other ocular pathologies.

Thus, the user profile adjusting means (2) can comprise a first menu where the age group is selected and a second menu where the ocular pathology information is selected. The particular combination of the above groups between them would lead the different user profiles (UP1, UP2, . . . , UPn).

As FIG. 9 shows, the user profile adjusting means (2) are connected upstream to the control means (1.3) in such a way that selected user profile among at least the first user profile (UP1) and the second user profile (USP2) is transmitted to the control means (1.3).

Thus, said selected user profile is an input for the control means (1.3) for controlling the lighting device (1.2) connected downstream to the control means (1.3) particularly according to said user profile (UP1, UP2).

The user profile adjusting means (2) can be connected with the control means (1.3) through a wireless communication protocol such as near field communication (NFC), Bluetooth, Wi-Fi, radio frequency, cloud-based communication interface, or any other communication protocol. Additionally, the user profile adjusting means (2) can be connected with the control means (1.3) through a non-wireless communication protocol such as LIN (Local Interconnect Network) or CAN (Controller Area Network)

The user profile adjusting means (2) can comprise for example a smartphone, a computer or an HMI device forming part of the vehicle, namely the dashboard or a screen provided directly on the vehicle interior part (1) for example.

Therefore, depending on the selected user profile, the control means (1.3) send instructions to the lighting device (1.2) to emit light taking into account the selected user profile in order to adapt the controlled reduction of the driver's pupil diameter to the pupil dynamics of the vehicle driver (D).

To summarise, the control means (1.3) are configured to provide instructions to the lighting device (1.2):

(1) to emit pulsed light according to a sinusoidal wave emission varying in regular periods being in the range between 10 s and 30 s, wherein each period comprises a minimum radiant flux value being greater than 0, (2) to emit light taking into account the user profile (UP1, UP2) defined through the user profile adjusting means (2) in such a way that the lighting device (1.2) emits a first pulsed light ($L_{UP1}$) according to the first user profile (UP1) and a second pulsed light ($L_{UP2}$) according to the second user profile (UP2), being the first and the second pulsed lights different.

Particularly, first pulsed light ($L_{UP1}$) and second pulsed light ($L_{UP2}$) are different due to the duration of the period and/or the values corresponding to the lowest and the highest points of the periods.

In addition, the control means (1.3) are configured to provide instructions to the lighting device (1.2):

(3) not to modify the pulsed light emitted while the lighting device (1.2) is emitting light when a change in the radiant flux coming from the vehicle exterior environment occurs. Therefore, the device does not comprise any sensor means which controls the device according the light conditions coming from the vehicle exterior.

Finally, the switching means (1.4) are configured to turn on and to turn off the lighting means.

Figure 3:
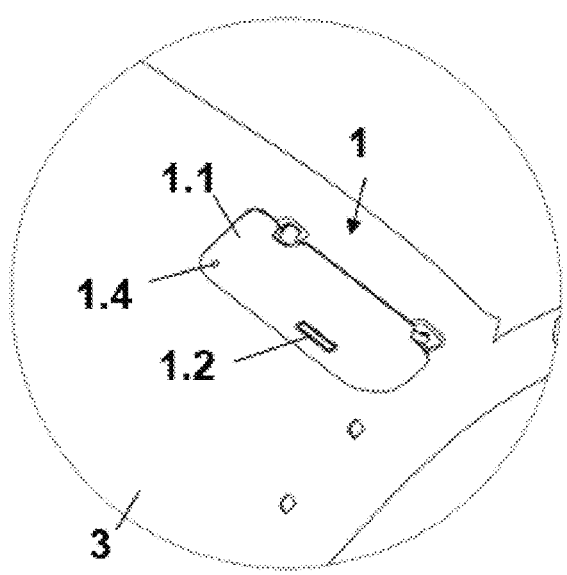
FIG. 3 shows a perspective view of an embodiment where the vehicle interior part forming the device is particularly a sunvisor.

They can be physically arranged in the vehicle interior part (1), as FIG. 3 shows, or in another place easily accessible for the vehicle driver (D). Likewise, they can be in communication with the control means (1.3) through a wireless or non-wireless communication protocol as the user profile adjusting means (2).

Preferably, the switching means (1.4) are controlled manually by the vehicle driver (D) for improving night vision during driving.

The invention also relates to a method for controlling the device for improving night vision of vehicle drivers above described. The method comprises the comprising the following steps:

selecting a user profile by a profile adjusting means (2) between a first user profile (UP1) and a second user profile (UP2), turning on a lighting device (1.2) above described arranged in a carrier (1.1) of a vehicle interior part (1) by a switching means (1.4), providing instructions to the lighting device (1.2) by a control means (1.3) configured to control the light emitted:

(1) to emit pulsed light according to a sinusoidal wave emission varying in regular periods being in the range between 10 s and 30 s, wherein each period comprises a minimum radiant flux value being greater than 0, (2) to emit light taking into account the user profile adjusting means (2) input in such a way that the first user profile (UP1) provides a first pulsed light ($L_{UP1}$) and the second user profile (UP2) provides a second pulsed light ($L_{UP2}$), both first and second pulsed lights ($L_{UP1}$, $L_{UP2}$) being different, (3) not to modify the pulsed light emitted while the lighting device (1.2) is emitting light when a change in the radiant flux coming from the vehicle exterior environment occurs.

The invention claimed is:

1. A device (10) for improving night vision of vehicle driver comprising: A vehicle interior part (1) comprising:
a) a carrier (1.1),
b) a lighting device (1.2) arranged in the carrier (1.1) comprising:
   i. lighting means (1.2.1) configured to emit light having a wavelength being in the range between 420 and 750 nm,
   ii. light diffusing means (1.2.2) configured to diffuse the light emitted by the lighting means and to emit the diffused light inside the vehicle,
c) control means (1.3) configured to control the light emitted by the lighting means (1.2.1), and
d) switching means (1.4) configured to turn on and to turn off the lighting means (1.2.1), wherein the device (10) for improving night vision of vehicle drivers further comprises a user profile adjusting means (2) configured for the vehicle driver (D) to select between a first user profile (UP1) and a second user profile (UP2), wherein the user profile adjusting means (2) are connected upstream to the control means (1.3) in such a way that the first user profile (UP1) and the second user profile (UP2) are an input for the control means (1.3), wherein the lighting device (1.2) is connected downstream to the control means (1.3) and said control means (1.3) are configured to provide instructions to the lighting device (1.2):

(1) to emit pulsed light according to a sinusoidal wave emission varying in regular periods being in the range between 10 s and 30 s, wherein each period comprises a minimum radiant flux value being greater than 0, (2) to emit light taking into account the user profile adjusting means (2) input in such a way that the first user profile (UP1) provides a first pulsed light (L.sub.UP1) and the second user profile (UP2) provides a second pulsed light (L.sub.UP2), both first and second pulsed lights (L.sub.UP1, L.sub.UP2) being different, and (3) not to modify the pulsed light emitted while the lighting device (1.2) is emitting light when a change in the radiant flux coming from the vehicle exterior environment occurs.

2. Device for improving night vision of vehicle drivers according to claim 1 wherein the lighting means are configured to emit light having a wavelength being in the range between 420 and 500 nm.

3. Device for improving night vision of vehicle drivers according to claim 1 wherein the lighting means are configured to emit light having a wavelength being in the range between 620 and 700 nm.

4. Device for improving night vision of vehicle drivers according to claim 1 wherein switching means are manually activated by the vehicle driver.

5. Device for improving night vision of vehicle drivers according to claim 1 wherein the lighting device (1.2) further comprises a light guiding means (1.2.3) between the lighting means (1.2.1) and the light diffusing means (1.2.2) in order to distribute and homogenise the light directly emitted by the lighting device (1.2).

6. Device for improving night vision of vehicle drivers according to claim 1 wherein the vehicle interior part is a sunvisor.

7. A method for controlling a device (10) for improving night vision of vehicle drivers comprising the following steps:
  selecting a user profile by a profile adjusting means (2) between a first user profile (UP1) and a second user profile (UP2), turning on a lighting device (1.2) arranged in a carrier (1.1) of a vehicle interior part (1) by a switching means (1.4), wherein the lighting device (1.2) comprises:
  i. lighting means (1.2.1) configured to emit light having a wavelength being in the range between 450 and 750 nm, and
  ii. light diffusing means (1.2.2) configured to diffuse the light emitted by the lighting means and to emit the diffused light inside the vehicle, wherein the user profile adjusting means (2) are connected upstream to a control means (1.3) in such a way that the first user profile (UP1) and the second user profile (UP2) are an input for the control means (1.3), wherein the lighting device (1.2) is connected downstream to the control means (1.3),
  providing instructions to the lighting device (1.2) by the control means (1.3) configured to control the light emitted by the lighting device (1.2):
    (1) to emit pulsed light according to a sinusoidal wave emission varying in regular periods being in the range between 10 s and 30 s, wherein each period comprises a minimum radiant flux value being greater than 0,
    (2) to emit light taking into account the user profile adjusting means (2) input in such a way that the first user profile (UP1) provides a first pulsed light (Lupi) and the second user profile (UP2) provides a second pulsed light (LUP2), both first and second pulsed lights (Luup LuP2) being different, and
    (3) not to modify the pulsed light emitted while the lighting device (1.2) is emitting light when a change in the radiant flux coming from the vehicle exterior environment occurs.

\* \* \* \* \*